Feb. 9, 1971 H. ARGAUD ET AL 3,561,254
APPARATUS FOR MEASURING THE PERMEABILITY OF POROUS WALLS
Filed Aug. 5, 1968 2 Sheets-Sheet 1

INVENTORS
HENRI ARGAUD
SERGE BIENFAIT
CHARLES EYRAUD
DANIEL MASSIGNON
BY Craig & Antonelli
ATTORNEYS

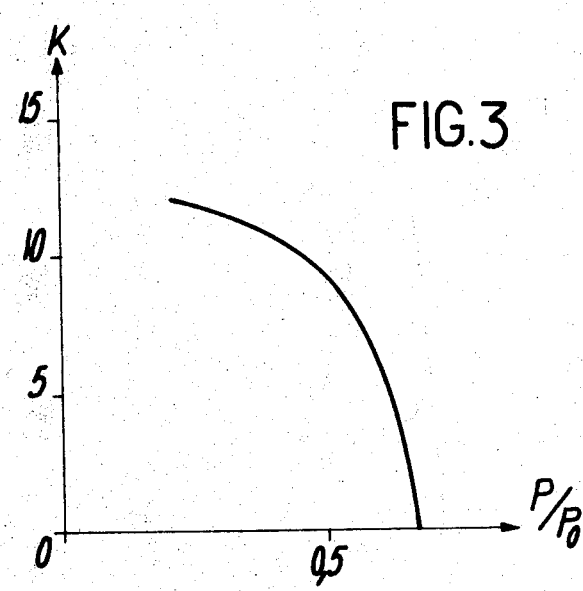
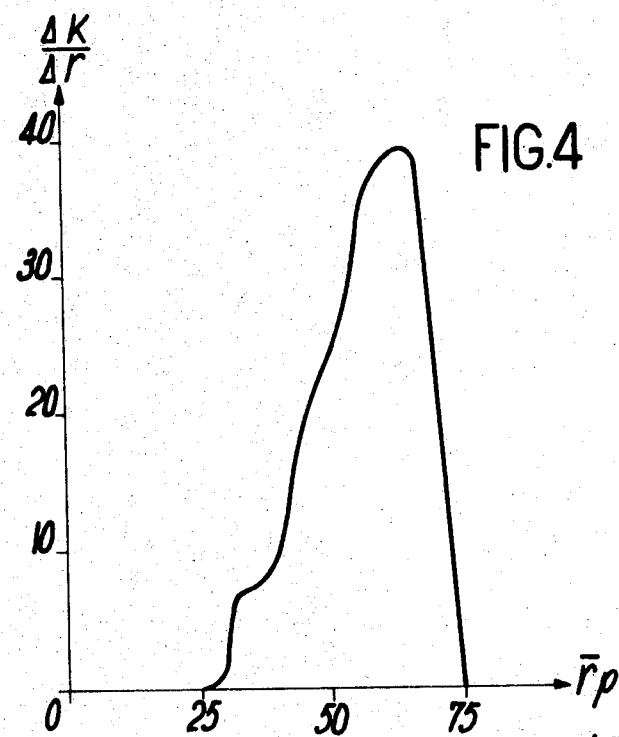

United States Patent Office 3,561,254
Patented Feb. 9, 1971

3,561,254
APPARATUS FOR MEASURING THE PERMEABILITY OF POROUS WALLS
Henri Argaud, Serge Bienfait, and Charles Eyraud, Lyon, and Daniel Massignon, Paris, France, assignors to Commissariat a l'Energie Atomique, Paris, France
Filed Aug. 5, 1968, Ser. No. 750,197
Claims priority, application France, Aug. 10, 1967, 117,600
Int. Cl. G01n 15/08
U.S. Cl. 73—38                                             1 Claim

ABSTRACT OF THE DISCLOSURE

A device for measuring the permeability of porous walls, especially microporous barriers, and for measuring the distribution of pore radii. Two compartments of a sealed enclosure are separate by the porous wall. A sinusoidal pressure variation is produced within one of said compartments and the phase of the variation which is transmitted into the other compartment through said porous wall is compared with the phase of a sinusoidal current produced by a straight form potentiometer with a sliding contact to measure the phase shift produced by transmission through said porous wall and thereby give a indication of the permeability of said porous wall.

---

The present invention relates to a method of measurement of the permeability of porous walls and of the distribution of pore radii as well as to a device for carrying out said method.

More specifically, the invention is concerned with a method for determining the radii of pores which are open to flow, or in other words which provide a flow path through a porous wall, and also for obtaining the curve of permeability of said wall in a variable absorption regime, porous walls of this type or so-called "barriers" being employed especially for such purposes as filtration, fabrication of catalytic sieves and the separation of isotopes.

The primary objective of this invention is to make said measurements conform to practical requirements more effectively than has been the case heretofore, especially insofar as they permit the distribution of pores which are open to flow and which are the only useful pores in the separation of isotopes, for example, whereas the methods which have been known up to the present time provided a distribution of the entire open-pore surface.

The invention mainly consists both in producing a sinusoidal pressure variation within one compartment of a sealed enclosure in which the porous wall to be studied forms a separation between two compartments and in studying the amplitude and phase-displacement of the variation which is transmitted into the other compartment through said porous wall.

The invention further consists of a device for the application of the method, said device being characterized in that it comprises, in conjunction with one of the two compartments which are separated by a porous wall of a sealed enclosure, a sinusoidal pressure generator composed of two coaxial cylindrical drums, one of said drums being rotatable about said axis and each drum being fitted with a frame which is movable in only one direction, both frames being driven by two eccentrics which are designed to keep strictly in step and fixed on a shaft disposed along said axis which is common to both of said drums, one of said frames being adapted to actuate a metallic bellows element which produces pressure variations while the other frame carries a sliding contact which is displaceable along a straight-form precision potentiometer which thus constitutes a sinusoidal current source having the same pulsation as said pressure, means being further provided for the relative indication of the position of one drum with respect to the other, said means being especially constituted by a graduated scale and a vernier provided respectively on oppositely-facing portions of said two drums.

The complementary description which now follows and the accompanying drawings will in any case serve to provide a clear understanding of the invention and, as will be readily understood, are given solely by way of indication and not in any sense by way of limitation.

In the accompanying drawings:

FIGS. 3 and 4 are respectively examples of two curves, the construction of which constitutes the objective of the invention.

It is known that the permeability K of a porous body is defined as the measurement of the rate of flow G of a gas through said body as related to the pressure gradient $\Delta P$ which gives rise to said rate of flow:

$$K = \frac{G}{\Delta P}$$

All the methods at present in use measure G, then $\Delta P$ and establish the ratio which, when G and $\Delta P$ are low in value, results in substantial relative errors. Moreover, the equilibrium of G at a given value $\Delta P$ takes a long time to obtain. As will be explained hereinafter, the method herein proposed completely removes the defects referred-to above and provides a very high degree of accuracy.

Figure 2:
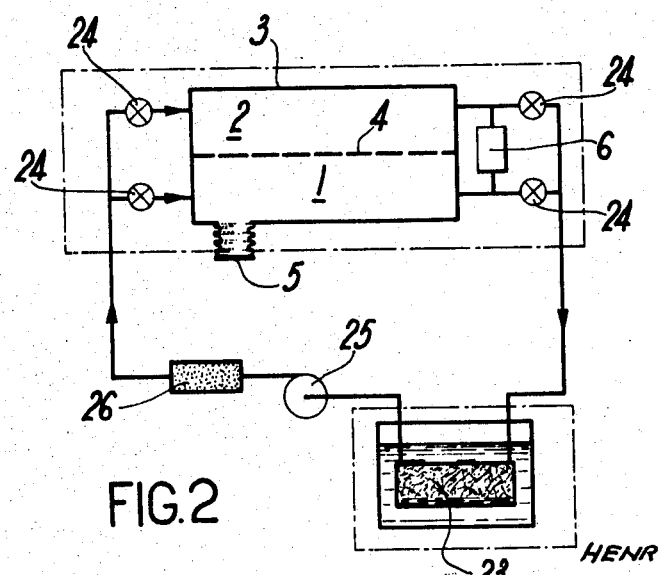
FIG. 2 is a diagrammatic view of an arrangement of the device in accordance with the invention.

Referring to FIG. 2, the different data of the problem will now be set forth in detail. The two compartments 1 and 2 of the enclosure 3 are separated by the porous wall 4 to be studied. The enclosure 3 is at the temperature T. The pressures P, volumes V and numbers of moles $n$ are given the index 1 on the side corresponding to compartment 1 and the index 2 on the side corresponding to compartment 2. Compartment 1 is fitted with a bellows element 5 which permits variation of the pressure P1. A differential manometer 6 is disposed between the two compartments 1 and 2.

There will now be set forth a certain number of postulates wherein, aside from the indices 1 and 2 which relate to the two compartments, the data are followed by the index 0 in respect of the time $t=0$.

(a) $V_2 =$ constant $$V_1 = V_{10}\left(1 - \frac{P}{P_{10}} \sin \omega t\right) \frac{P}{P_{10}} \ll 1$$

In this expression, P is uniform at one pressure and $V_{10}$ and $P_{10}$ are respectively the volume and the pressure when $\omega t = 0 \pm n K \pi$ (b) The permeability K is constant when the state of adsorption is fixed $$K = \frac{G}{\Delta P} = \text{constant}$$

(c) The law of ideal gases is applicable: the pressure variations take place over a small range (plus or minus 1 mm. of mercury)

(d) The total number of moles of gas is constant:

$$n_1 + n_2 = \text{constant}$$

then $dn_1 + dn_2 = 0$ (e) At the time $t=0$ $$P_1 = P_2 = P_{10} = \frac{n_{10}RT}{V_{10}} = \frac{n_{20}RT}{V_2}$$

wherein R is the ideal gas constant shown in the relationship $pV = nRT$.

(1) NON-POROUS MEMBRANE: K=0

We have in this case an additional condition:

$$n_1 = \text{constant} = n_{10}$$
$$n_2 = \text{constant} = n_{20}$$

We write $(\Delta P)_{K=0} = RT\left(\dfrac{n_{10}}{V_1} - \dfrac{n_{20}}{V_2}\right)$ Let $(\Delta P_{K=0} = RT\left[\dfrac{n_{10}}{V_{10}\left(1 - \dfrac{P}{P_{10}}\sin \omega t\right)} - \dfrac{n_{20}}{V_2}\right]$ Since $P/P_{10}$ is very small compared with 1, then it will be assumed that $$(\Delta P)_{K=0} = \dfrac{RT n_{10}}{V_{10}}\left(1 + \dfrac{P}{P_{10}}\sin \omega t\right) - \dfrac{RT n_{20}}{V_2}$$

Taking account of the initial conditions $$(P_1 = P_2 = P_{10})$$

$$(\Delta P)_{K=0} = P \sin \omega t$$

It is found that P is none other than the amplitude of the pressure variations.

Furthermore, the pressure $P_1$ is out-of-phase exactly by $\pi$ with respect to the volume $V_1$ when there is no leakage of gas (zero permeability). We shall henceforth consider the pressure and not the volume as being the original of phases in order to eliminate the constant $\pi$.

(2) POROUS MEMBRANE K≠0

We now have:

$$\dfrac{dn_1}{dt} = -K\Delta P$$

At the end of the time $t$, there has been diffused:

$$\Delta n_1 = -K\int_0^t \Delta P \, dt$$

Therefore:

$$n_1 = n_{10} + \Delta n_1$$

and $$n_2 = n_{20} - \Delta n_1$$

Hence:

$$\Delta P = RT\left(\dfrac{n_{10}}{V_1} - \dfrac{n_{20}}{V_2}\right) + \Delta n_1 RT\left(\dfrac{1}{V_1} + \dfrac{1}{V_2}\right)$$

Let:

$$\Delta P = (\Delta P)_{K=0} + \Delta n_1 RT\left(\dfrac{1}{V_1} + \dfrac{1}{V_2}\right)$$

$$\Delta P = P \sin \omega t - KRT \dfrac{1}{V_1} + \dfrac{1}{V_2}\int_0^t \Delta P \, dt$$

Replacing $$\dfrac{1}{V_1} \text{ by } \dfrac{1}{V_{10}}\left(1 + \dfrac{P}{P_{10}}\sin \omega t\right)$$

$$P = P \sin \omega t - KRT\left(\dfrac{1}{V_{10}} \dfrac{1}{V_2}\right)\int_0^t P \, dt$$

$$- \dfrac{KRT}{V_{10}} \dfrac{P}{P_{10}} \sin \omega t \int_0^t \Delta P \, dt$$

If we set: $P = y$ $$\left.\begin{array}{l}\dfrac{KRT}{V_{10}} = \lambda_1 \\ \dfrac{KRT}{V_2} = \lambda_2\end{array}\right\} \lambda_1 + \lambda_2 = \lambda$$

The preceding equation is then written:

$$y = P \sin \omega t - \lambda \int_0^t y \, dt - \lambda 1 \dfrac{P}{P_{10}} \sin \omega t \int_0^t y \, dt$$

It is noted that, if:

$P = \pm 1$ mm. of mercury
$P_{10} = 760$ mm. of mercury $$\dfrac{P}{P_{10}} = \dfrac{1}{760}$$

Moreover:

$$\lambda 1 \simeq \dfrac{\lambda}{2}$$

The last term of the equation is therefore negligible:

$$y = P \sin \omega t - \lambda \int_0^t y \, dt$$

By derivation, we obtain a differential equation of the first order of classical resolution:

$$y' + \lambda y = P\omega \cos \omega t$$

The full solution is written:

$$y = P \cos \varphi \sin (\omega t + \varphi) - P \cos \varphi \sin \varphi e^{-\lambda t}$$

with $$tg\varphi = \dfrac{\lambda}{\omega}$$

Whence $$tg\varphi = \dfrac{KRT}{\omega}\left(\dfrac{1}{V_{10}} + \dfrac{1}{V_2}\right)$$

$V_{10}$ and $V_2$ are design constants. RT is constant for a given manipulation. The exponential term is a transient which disappears very rapidly.

If $\varphi$ and $\omega$ can be determined, one obtains K.

NOTE (1) In order to have K as absolute value, the apparatus must be calibrated and it is necessary to know the volumes $V_{10}$ and $V_2$. In fact, the feature of interest is the shape of the curve and the distribution spectrum of the pore radii which is deduced therefrom. We will consequently retain only the formula:

$$K = \omega tg\varphi$$

If we know $\omega$ beforehand, the only measurement to be taken is that of $\varphi$.

(2) It is readily demonstrated that the minimum of errors in respect to K takes place in the vicinity of the optimum value $\varphi = 45°$. By way of example, if the measurement is carried out to within plus or minus 30 minutes, the degree of accuracy in respect to K will be:

2% is $30° \leq \varphi \leq 60°$
2.5% is $22° \leq \varphi \leq 68°$ (3) In accordance with the foregoing observation, it will be understood that, in the case of a given permeability K, it is possible to have a number of pairs ($\varphi$, $\omega$). The mean of the values obtained ensures a precision of 1% in respect of K.

(4) Before taking any measurement in variable permeability, it should be ensured that $\varphi = 0$ when K=0. Depending on the pressure transducer which is employed, it is possible that a phase delay $\varphi_p$ (stray phase) may be observed. In that case we have:

$$\varphi \text{ measured} = \varphi + \varphi_p$$

Figure 1:
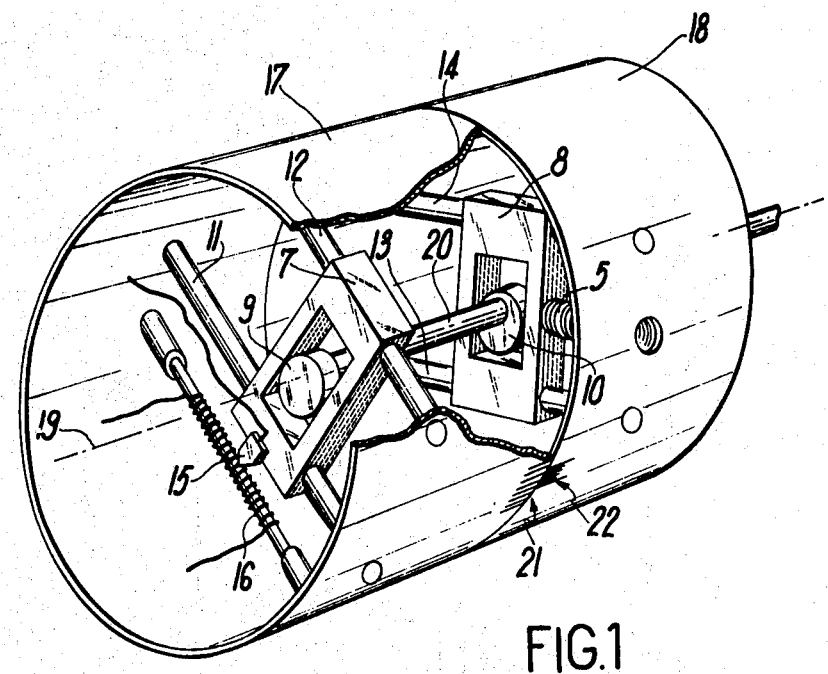
FIG. 1 is a fragmentary view in isometric perspective showing a device in accordance with the invention.

Referring now to FIG. 1, there will be described one example of a pressure transducer according to the invention, that is to say a device which is capable of actuating the bellows element 5 of FIG. 2 in a satisfactory manner for the application of the method according to the invention.

Said pressure transducer is made up of two frames 7 and 8 which are capable of displacement only in one direction. Said frames are driven by two eccentrics 9 and 10 which are designed to keep strictly in step in a pure sinusoidal movement. All sliding bearings have been replaced by ball bearings or rollers in order to provide smooth and vibration-free operation, for example on the support shafts 11, 12 and 13, 14 respectively.

The frame 8 is intended to produce pressure variations by means of the metallic bellows element 5 or any other means which provides the same result. The other frame 7 is fitted with a sliding contact 15 which is displaceable along a straight-form precision potentiometer 16 and thus constitutes a sinusoidal current source having the same pulsation as the pressure.

Each frame is intended to move within drums 17 and 18 whose axis 19 is that of the drive shaft 20.

The drum 17 which carries the potentiometer is rotatable about the common axis 19. A scale 21 which is graduated in degrees is cut around the periphery of the drum.

The pressure-generating drum 18 is stationary and serves as a support for the whole assembly. This drum is provided with a precision vernier 22 which is located opposite to the movable scale 21 and permits reading to 5 minutes of arc.

PRINCIPLE OF MEASUREMENT

The electrical signal which is delivered by the potentiometer 16 is displaced in phase by a given angle $\varphi_m$ with respect to the origin (movement of the bellows element 5). It is only necessary to rotate the movable drum 17 in order that the potentiometer signal should be brought by comparison in phase with the pressure transducer signal in compartment 2. The value of the angle $\varphi_m$ is then read off. If the stray phases are zero, $\varphi_m = \varphi$. The permeability is equal to $\omega/\text{tg}\varphi$.

A single-thread worm which engages with a ring-gear having 360 teeth permits the rotation (and positional locking) of the movable drum 17 with respect to the stationary drug 18. One revolution of the worm therefore causes the drum to rotate through one degree. Provision is made for rapid disengagement of the worm.

A comparison which permits phasing of the two electrical signals can conveniently be carried out on a recorder having two rectangular channels XY. If the two voltages are out of phase, an ellipse is obtained. If they are in phase, a straight line is obtained.

The different pulsations $\omega$ are delivered by a 24-speed box which is driven by an overpowered synchronous motor (1500 r.p.m.). The real speeds are strictly constant and equal to the theoretical speeds. The range employed depends on the permeabilities encountered, named 0.125 r.p.m. to 25 r.p.m. in the case of the porous barriers which are employed.

The remainder of the equipment is intended to obtain stable and known adsorption states. The general arrangement is shown in FIG. 2.

The porous barrier 4 constitutes the hot point of the assembly at the temperature $T_B$. The evaporator 23, the temperature $T_F$ of which is lower than or at a maximum equal to $T_B$ governs the pressure of the adsorbable vapor within the apparatus. Manipulation is performed in two steps.

(1) Establishing of the desired vapor pressure, that is to say of a given adsorption state:

the 4 electrovalves such as the electrovalve 24 are open, the circulating pump 25 is started up, a dehydrating agent 26 is provided.

After a given time interval which depends on the adsorption capacity of the porous barrier 4, the pump 25 is stopped and the electrovalves 24 are closed. A measurement of permeability can accordingly be taken.

(2) Measurement of K:

The bellows element 5 is actuated and phasing is carried out. The angle $\varphi_m$ is read off on the graduated drum 17 (shown in FIG. 1).

In order to be sure to attain the adsorption equilibrium corresponding to the vapor pressure given by the cold point, operations 1 and 2 are carried out once again. If the second measurement of $\varphi_m$ is the same, equilibrium has therefore been attained. The temperature $T_F$ can then be changed in order to obtain another relative pressure $P/P_0$.

FIG. 3 shows the type of curve which is obtained $$K = f(P/P_0)$$

of the permeability of the porous barrier under study as a function of the relative pressures.

Similarly, FIG. 4 shows the type of curve which is obtained $$\frac{\Delta K}{\Delta r} = f(\bar{r}p)$$

of the distribution of radii of the pores which are open to flow.

As has become apparent from the foregoing, the present invention is not limited in any sense to the mode of application or to the exemplified embodiment which has been described with reference to the accompanying drawings but extends to all alternative forms.

What is claimed is:

1. A device for the measurement of the permeability of porous walls and particularly microporous barriers and the distribution of pore radii utilizing a sealed enclosure separated by a porous wall into two compartments which comprises, providing a sinusoidal pressure generator in one of said compartments, said generator composed of two coaxial cylindrical drums, one of said drums being rotatably mounted about said axis, each drum being fitted with a frame member which is movable in only one direction, eccentric means, designed to keep strictly in step, associated with each of said frame members for driving said frame members, said eccentric means being fixed on a shaft disposed along said axis which is common to both of said drums, a metallic bellows means associated with one of said frame members, said frame member being adapted to actuate said bellows means to produce pressure variations, the other frame member being adapted to carry a sliding contact which is displaceable along a straight-form precision potentiometer which thus constitutes a sinusoidal current source having the same pulsation as said pressures, and means provided for indicating the relative position of one drum with respect to the other drum, said means being especially constituted by a graduated scale and a vernier provided respectively on oppositely-facing portions of said two drums, said device comparing the phase of the variation which is transmitted into the other compartment through said porous wall with the phase of the sinusoidal current produced by said potentiometer to measure the phase shift produced by transmission through said porous wall.

References Cited

UNITED STATES PATENTS 3,256,732    6/1966    Gremion _____ 73—38
3,401,554    9/1968    Bonnet _____ 73—38

S. CLEMENT SWISHER, Primary Examiner

W. A. HENRY, Assistant Examiner